(12) United States Patent
Ponikiewski et al.

(10) Patent No.: US 11,945,495 B2
(45) Date of Patent: Apr. 2, 2024

(54) STEERING COLUMN ASSEMBLY

(71) Applicant: ZF Steering Systems Poland Sp. Z.o.o., Czechowice-Dziedzice (PL)

(72) Inventors: Pawel Ponikiewski, Pewel Mala (PL); Artur Wojtalik, Katowice (PL); Damian Uchyla, Strumień (PL)

(73) Assignee: ZF Steering Systems Poland Sp. Z.o.o., Czechowice-Dziedzice (PL)

( * ) Notice: Subject to any disclaimer, the term of this patent is extended or adjusted under 35 U.S.C. 154(b) by 0 days.

(21) Appl. No.: 17/974,599

(22) Filed: Oct. 27, 2022

(65) Prior Publication Data
US 2023/0131460 A1    Apr. 27, 2023

(30) Foreign Application Priority Data

Oct. 27, 2021 (EP) .................................... 21461609
Feb. 17, 2022 (GB) .................................... 2202122

(51) Int. Cl.
  *B62D 1/187*    (2006.01)
  *B62D 1/184*    (2006.01)
(52) U.S. Cl.
  CPC ............ *B62D 1/187* (2013.01); *B62D 1/184* (2013.01)
(58) Field of Classification Search
  CPC ........... B62D 1/187; B62D 1/184; B62D 1/18
  See application file for complete search history.

(56) References Cited

U.S. PATENT DOCUMENTS 5,257,813 A * 11/1993 Snell .................. B62D 1/184
                                                280/775
5,961,146 A * 10/1999 Matsumoto ............ B62D 1/195
                                                280/775
7,354,068 B2 * 4/2008 Ishida .................... B62D 1/184
                                                280/775

(Continued)

FOREIGN PATENT DOCUMENTS

CN       113039114 B  *  2/2023  ............ B62D 1/184
DE    102019210381 A1     2/2020

(Continued)

*Primary Examiner* — Drew J Brown
(74) *Attorney, Agent, or Firm* — Robert James Harwood

(57) ABSTRACT

A steering column assembly for a vehicle comprising a shroud comprising an axially movable upper part and an axially fixed lower part, the upper and lower parts moving telescopically to provide adjustment for reach of the steering column assembly;
a steering shaft which is supported by the shroud, a pivot which connects a part of the lower part to a fixed part of the vehicle, a clamp mechanism which releasably fixes the upper and lower shroud parts in position relative to one another and which also fixes the shroud in position relative to a further fixed part of the vehicle, a mounting bracket, fixed relative to the vehicle, a sprung support assembly which includes at least one guide element that has an outer surface that engages a complimentary shaped guide track of the mounting bracket, characterised in that the sprung support assembly is fixed in position to the upper shroud part and bears upon the mounting bracket such that the sprung support assembly provides a reaction force that at least partially supports the shroud when the clamp mechanism is released.

19 Claims, 8 Drawing Sheets

(56) References Cited

U.S. PATENT DOCUMENTS

| | | | | |
|---|---|---|---|---|
| 7,780,196 B2* | 8/2010 | Cymbal | ................. | B62D 1/184 |
| | | | | 188/374 |
| 8,826,769 B2* | 9/2014 | Takezawa | ............... | B62D 1/189 |
| | | | | 280/778 |
| 9,457,832 B2* | 10/2016 | Davies | ................... | B62D 1/184 |
| 2005/0166700 A1* | 8/2005 | Ishida | ................... | B62D 1/184 |
| | | | | 74/493 |
| 2007/0252372 A1 | 11/2007 | Spano et al. | | |
| 2018/0022376 A1 | 1/2018 | Sugishita | | |

FOREIGN PATENT DOCUMENTS

| | | |
|---|---|---|
| GB | 2463138 A | 3/2010 |
| JP | 2016002771 A | 1/2016 |

* cited by examiner

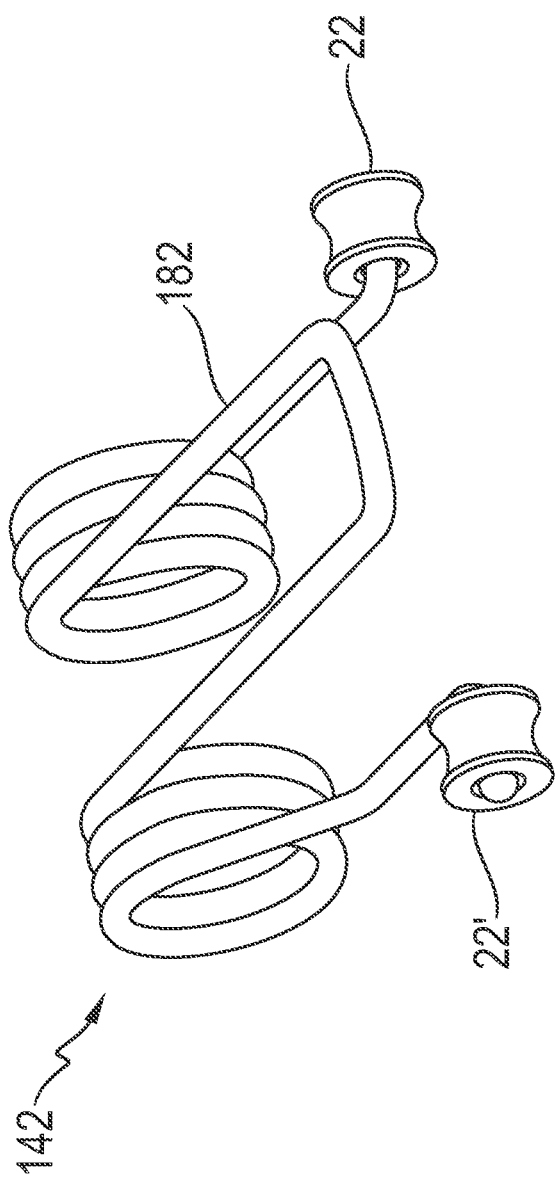

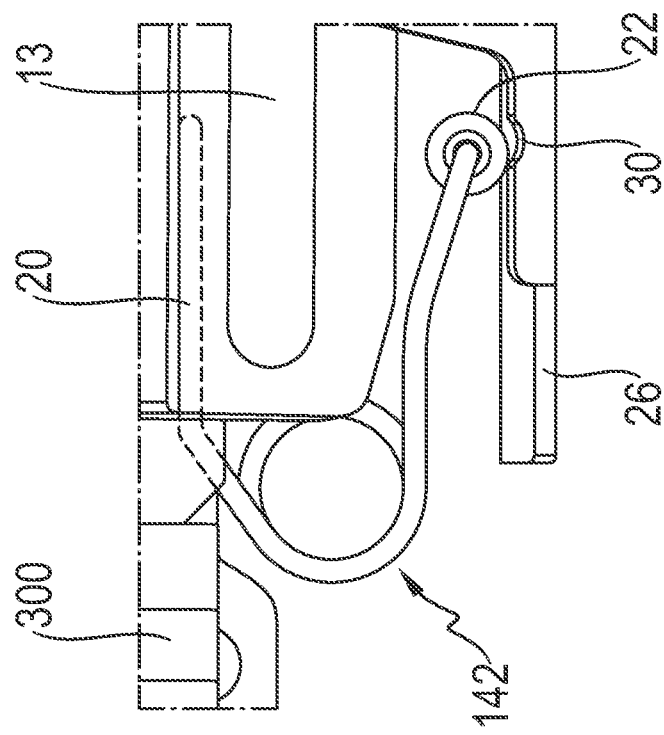
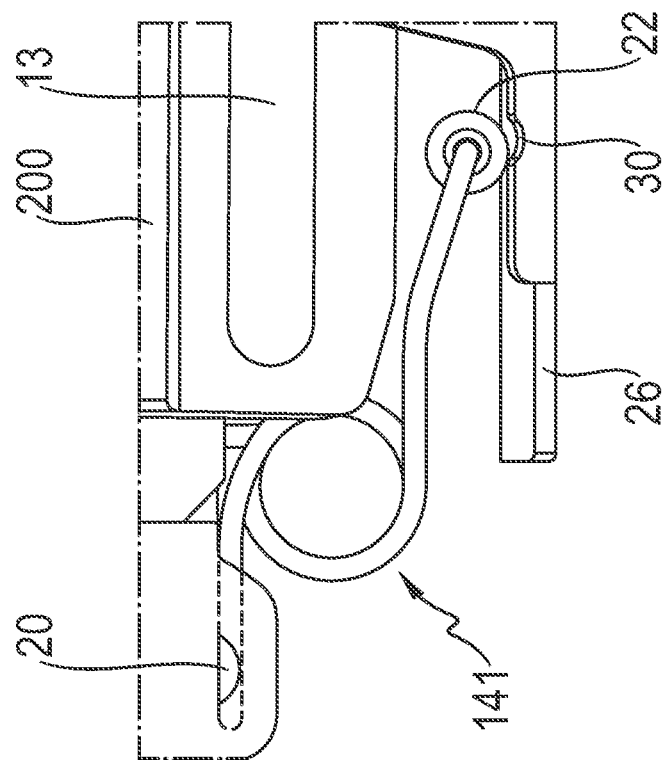
Fig. 8a
Fig. 8b

STEERING COLUMN ASSEMBLY

CROSS-REFERENCE TO RELATED APPLICATION

This application claims priority to European Patent Application No. 21461609.6, filed Oct. 27, 2021 and GB Patent Application No. 2202122.4, filed Feb. 17, 2022, the disclosure of which is incorporated herein by reference in its entirety.

TECHNICAL FIELD

This disclosure relates to improvements in steering column assemblies for vehicles.

BACKGROUND

It is known to provide a steering column assembly in which the steering shaft is adjustable for steering wheel height known as reach and for steering wheel distance known as rake. Such assemblies are known as double adjust steering columns. A steering column shroud is provided that supports the steering shaft that in turn supports the steering wheel. The shroud is in two parts, an upper part and a lower part, with the upper part telescoping over or into the lower part to permit the length of the shroud, and hence reach of the steering, to be adjusted. The lower part is secured to the vehicle at first point by a pivot and the upper part is secured to a fixed part of the vehicle at location nearer the steering wheel by a releasable damp mechanism. When the damp mechanism is damped the upper and lower parts of the shroud are locked together. When released, the upper and lower parts of the shroud can move telescopically to enable reach to be adjusted. Also the whole shroud can be tilted up or down relative to the vehicle by pivoting around the pivot to provide rake adjustment.

SUMMARY

The weight of the steering wheel and shaft and the shroud can be quite considerable, especially so where the column assembly also includes an electric motor and gearbox or a torque sensor, all of which are common parts of many electric power assisted steering assemblies. If the damp mechanism is released and some additional support of the shroud is not present the steering wheel and shroud could fall down into a driver's lap with considerable force. Also, the weight of the assembly may inconvenience the driver when raising the wheel to the required position and securing the clamp mechanism. As the driver typically needs one hand free to operate the clamp this adjustment may prove burdensome.

To solve this problem, it is common to provide a spring loaded support mechanism which acts between the vehicle and a part of the shroud. The spring mechanism takes some of the weight of the shroud and shaft and wheel when the clamp mechanism is released for adjustment. This damps the fall of the assembly and assists the driver when they try to make rake adjustments by taking some of the weight.

In one known example of a possible prior art arrangement for a spring loaded support mechanism, the spring mechanism comprises a sling having a support bar that passes under the upper part of the shroud and which is connected at each end to a respective spring arm. One arm is provided on each side of the shroud and connects an end of the arm to a fixed part of the vehicle body, usually above the shroud. Each arm comprises a coil spring or a leaf spring. In adjusting the assembly for reach, the base of the sling must slide over the lower surface of the upper shroud part as it moves relative to the lower shroud part. This movement can be quite stiff if friction is high and the operation may be noisy.

Another arrangement is taught in the applicants earlier patent application WO2013/171497 in which a sprung support assembly is secured to a fixed part on the vehicle and includes an axle that passes underneath an upper portion of a steering column shroud, whereby a cylindrical roller that surrounds a part of the axle engages the underside of the shroud. This provides a simple arrangement but the applicant has appreciated that it results in a varying counterbalance torque as the steering is adjusted for reach because the location of the spring relative to the steering wheel is variable.

According to the disclosure a steering column assembly for a vehicle can comprise a shroud comprising an axially movable upper part and an axially fixed lower part, the upper and lower shroud parts moving telescopically to provide adjustment for reach of the steering column assembly, a steering shaft which is supported by the shroud, a pivot which connects a part of the lower part to a fixed part of the vehicle, a clamp mechanism which releasably fixes the upper and lower parts in position relative to one another and which also fixes the shroud in position relative to a further fixed part of the vehicle, and a sprung support assembly which is fixed in position to the upper shroud part and bears upon a mounting bracket that is fixed relative to the body of the vehicle, whereby the sprung support assembly includes at least one guide element that has an outer surface that engages a guide track of the mounting bracket, the sprung support assembly providing a reaction force that at least partially supports the shroud when the clamp mechanism is released.

The guide element, which may be a generally cylindrical roller, may roll along the guide track as the steering column assembly is adjusted for reach or rake with little or no sliding between the shroud and outer surface of the guide element.

In an arrangement the sprung support assembly comprises a spring element with a pair of spring arms, each spring arm comprising a coil spring and having a first end terminated with an extending part that is fixed to the upper shroud part and a second end terminated with an extending part that joins a corresponding part of the other spring arm to define an axle that supports the at least one guide element.

The axle may support two guide elements, spaced apart along the axle and each engaging a respective guide track. The use of two guide elements may provide a higher lateral stiffness to the sprung support assembly which may help prevent rotation of the upper shroud part about its' axis especially when the clamp mechanism is in the released condition.

The axle may comprise a connecting bar that joins the opposing second ends of the spring arms and extends orthogonal to the axis of the shroud.

In an alternative, two axles may be provided which are spaced apart, each connected to a respective second end of a spring arm and each carrying a guide element such as a cylindrical roller.

Each spring arm may comprise a bent metal rod. The coil spring of each arm may have one, or two or three or more complete coils of rod.

Both spring arms and the axle or axles may be formed from a single elongate rod.

Unlike the prior art, the spring element of the sprung support assembly is connected at a fixed position to the upper shroud part and slides along a fixed bracket. The path of the guide element defined by the guide track may be arranged such that the spring reaction force does not vary as the steering column assembly is adjusted for reach. To achieve this the guide track may extend in a direction that is parallel to the axis of the steering shaft. This arrangement will help ensure a constant torque is applied to the steering shroud when the clamp mechanism is released for any reach position of the steering column assembly.

The guide track may be inclined downwards along two portions with the lowest end of each inclined portion meeting at a point so that the guide track has a v or u shape such that the forces acting on the steering column assembly will cause the guide element to settle at that point when the clamp mechanism is released. When in this position, the steering column assembly may be set at a mid-range position for reach. The steering assembly will automatically settle to this mid-range reach position when the clamp mechanism is released.

In an alternative, the guide track may include a groove at the central point to help the user find the mid-range position for reach during adjustment but the shape of the guide track either side of this point may be chosen so as not to achieve an automatic centering of the rake of the steering column assembly.

In a further alternative, the guide track may be shaped so that on release of the clamp mechanism in any position the weight of the steering column assembly shroud and the combined weight of the steering wheel and steering shaft are perfectly counterbalanced. The rake will then not change as the clamp is released until the driver applies an external force to the steering wheel.

The guide element may be located at a position that is offset from each coil spring in a direction that faces away from the steering wheel.

The first ends of each spring arm may be connected by a linking portion that extends transverse to the axis of the shroud and locates within a recess in the upper shroud part. It may be press fit within the recess.

The first ends of the spring arms may extend from the coil springs towards the steering wheel, or extend vertically, or extend in a direction away from the steering wheel.

The mounting bracket may comprise a U-shaped bracket and a main support bracket that fixes the steering column shroud to a fixed part of the vehicle. The main support bracket may comprise a base part that passes below the shroud and has an upper face that defines or supports the guide track and a pair of arms that project upwards on opposing sides of the shroud to connect with the remainder of the main support bracket. This is convenient as the mounting bracket will be in a known position relative to the rest of the steering assembly prior to fixing to the vehicle.

In an alternative, the base part that carries the guide track may be fixed to some other part such as directly to a cross beam of the vehicle.

BRIEF DESCRIPTION OF DRAWINGS

There will now be described, by way of example only, a number of arrangements of the disclosure with reference to the accompanying drawings of which:

FIG. 7 is a view of a still further alternative shape of sprung support assembly;

FIG. 8*a* shows the sprung support assembly of FIG. 6 in a position of use; and FIG. 8*b* shows the sprung support assembly of FIG. 7 in a position of use.

DETAILED DESCRIPTION

Figure 1:
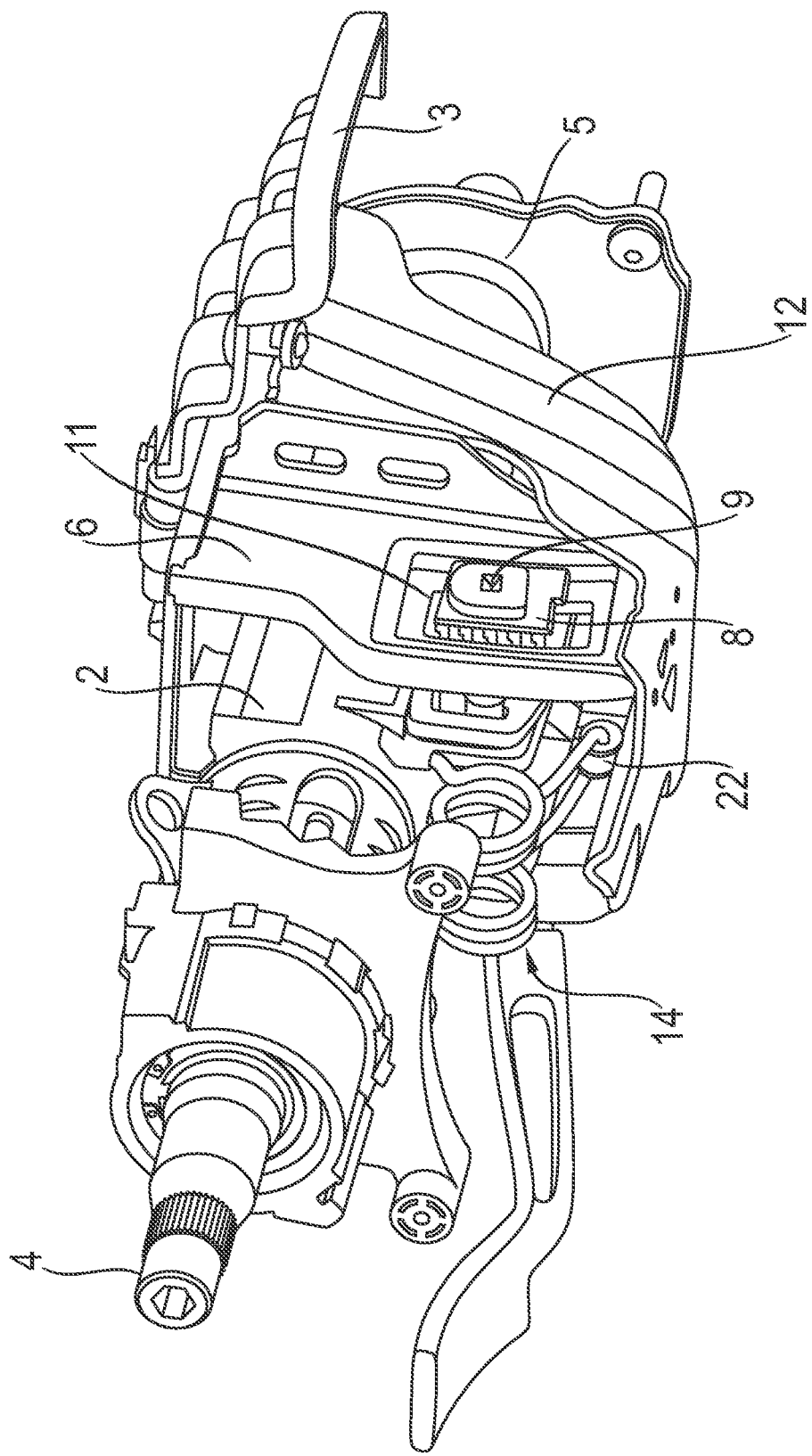
FIG. 1 is a perspective view of an arrangement of a steering column assembly in accordance with a first aspect of the disclosure seen from one side.
Figure 2:
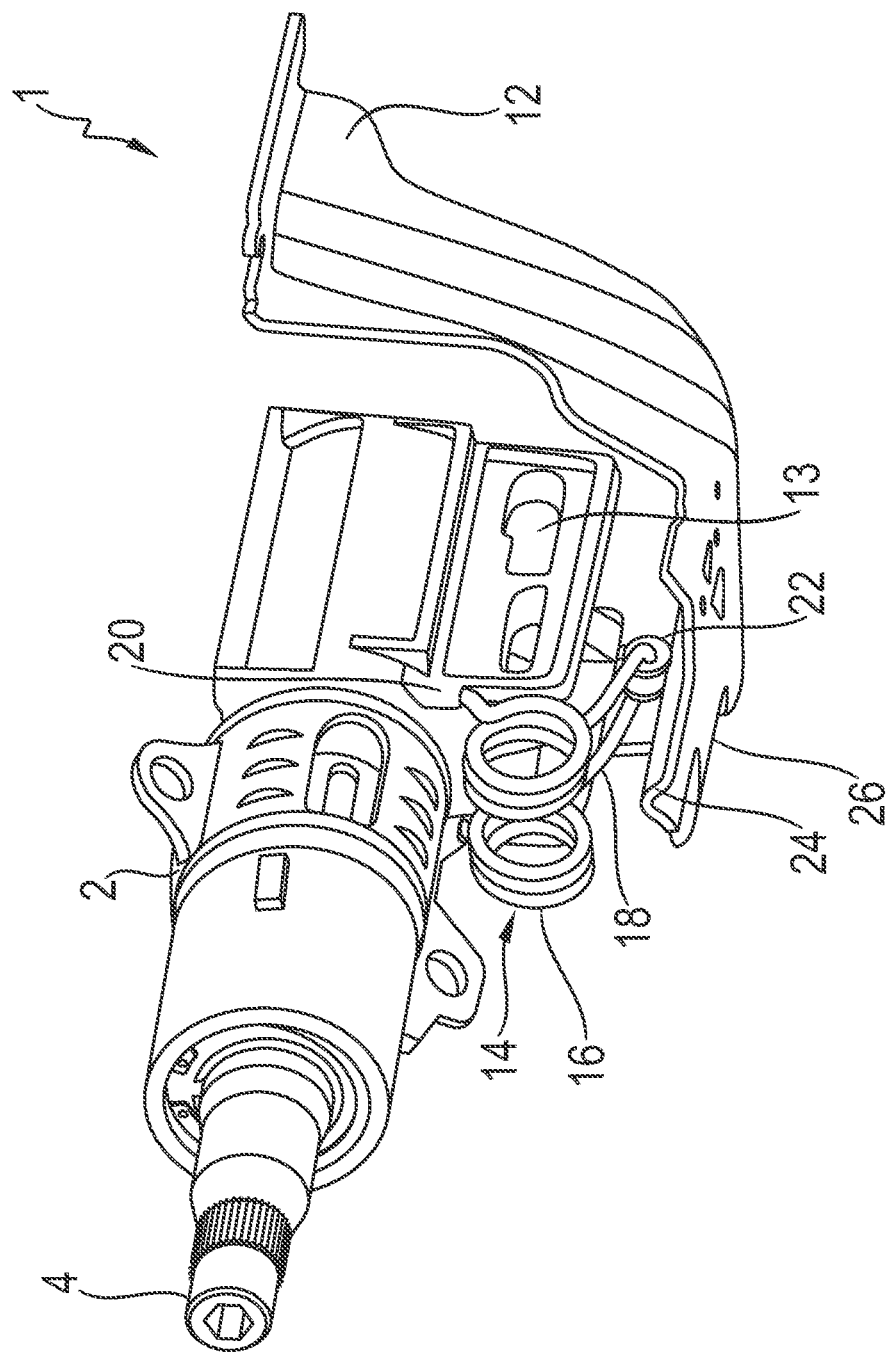
FIG. 2 is a view of only part of the steering column assembly of FIG. 1 viewed in perspective from below and to one side.

A steering column assembly (1) is shown in FIG. 1 and partially in FIG. 2 of the accompanying drawings. The assembly comprises a telescopic shroud having an upper axially movable part (2) and a lower axially fixed part (3) with the two connected one inside the other so they can move telescopically. The lower part is fixed to the vehicle (not shown) by a pivot pin. A steering shaft (4) is supported in bearings journaled to the inside of the shroud. One end of the shaft can be seen projecting from the upper movable shroud part. This has a set of splines for engaging with corresponding splines of a steering wheel. An optional electric power assisted steering gearbox (5) is connected to the end of the steering shaft (4) furthest from the steering wheel and to the lower fixed part of the shroud. The gearbox (5) connects the shaft (4) to a motor which provides assistance when the driver tries to turn the wheel by applying a torque of the same sense as that applied by the driver. The gearbox (5) also connects the shaft (4) through further mechanical links such as a steering rack to the road wheels (not shown) in a known manner.

The telescopic shroud (2,3) is fixed to the vehicle at one point by the pivot (not shown) close to the gearbox and at another point closer to the steering wheel through an adjustable clamp mechanism (8). The clamp mechanism (8) may take any known form, and functionally prevents the upper shroud part (2) moving axially when it is in the damped condition and allows it to move axially when in the released condition to permit reach adjustment of the steering column assembly (1). The damp mechanism (8) may also be arranged to permit axial collapse of the upper shroud part (2) when a significant load is applied to the steering wheel during a crash.

One end of the clamp mechanism (8) comprises a locking lever (9) allowing the clamp mechanism (8) to be locked and unlocked can be seen in FIG. 1. The clamp mechanism (8) secures the upper shroud part (2) to a mounting bracket which is fixed to the vehicle body. The clamp mechanism (8) passes through a vertical slot in the mounting bracket and allows the steering column assembly (1) to be adjusted for rake. The clamp mechanism (8) also passes through a slot (13) in the upper shroud part (2) that is parallel to the axis of the steering shaft (4). This allows the upper shroud part (2) to be adjusted for reach. This slot (13) can best be seen in FIG. 2 and FIG. 3.

The reach and rake movement is only possible when the clamp mechanism (8) is in the released condition, being prevented when the clamp mechanism (8) is in the clamped condition. When clamped the clamp mechanism (8) fixes the upper shroud part (2) in position.

More specifically the mounting bracket has two portions. The first is a fixed U-bracket (6) which has an inverted U-shape in cross section (when viewed along the length of the shroud). The upper part of the U-bracket (6) is rigidly fixed to the vehicle body above the shroud (2,3) and has two arms that depend down either side of the shroud (2,3). Each arm of the U-bracket (6) is provided with a vertically extending elongate slot (11). One elongate slot (11) can be seen in FIG. 1.

The U-bracket (6) is in turn connected to a main support bracket (12) which forms a second portion of the mounting bracket and is rigidly fixed to the vehicle body. The U-bracket (6) and the main support bracket (12) are connected by frangible connectors (not shown).

It will be appreciated that the weight of the shroud (2, 3), the steering shaft (4), the steering wheel and the moving part of the clamp mechanism (8) is considerable. A sprung support assembly is therefore provided to help carry some of the weight when the damp mechanism is unclamped i.e., in the released condition.

Figure 3:
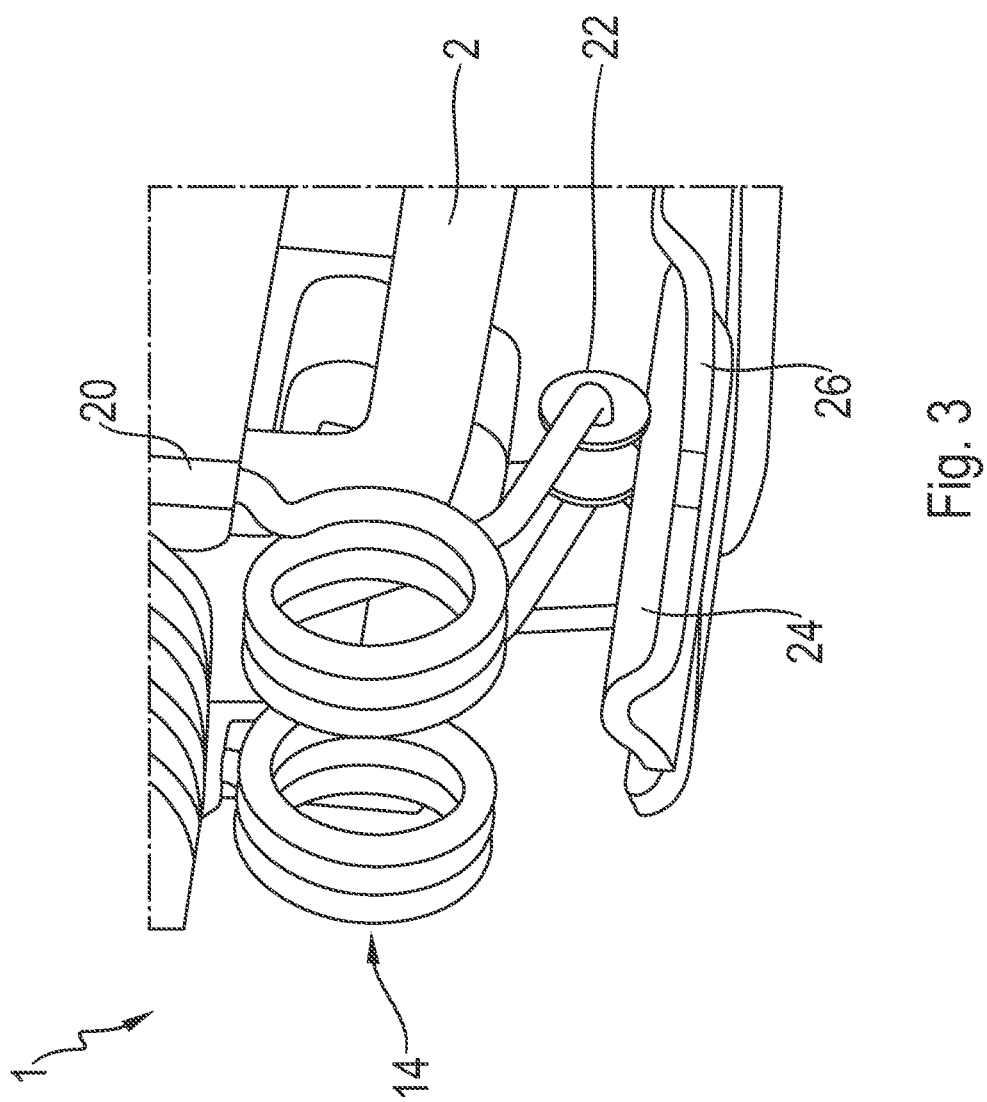
FIG. 3 is an enlarged perspective view of the portion of the spring assembly comprising the two spring arms, axle and roller and engagement with the mounting bracket.

The sprung support assembly (14) of the arrangement includes a spring element (16) that is formed from a single length of bent metal wire or rod as shown in FIGS. 2 and 3. It has a lower portion forming an axle that passes under the shroud (2,3) and which is connected to the vehicle by two spring arms (18), one on each side of the shroud (2,3). Each spring arm (18) comprises a torsion coil spring with multiple turns. A first end of each arm is secured in a recess (20) in the upper shroud part (2), a second end extends from the coil to connect to the axle. The spring element (16) therefore is fixed in position relative to the upper shroud part (2).

The axle supports a single guide element (22) that is a roller that engages with a guide track (24) formed on a base part (26) of the main support bracket (12). This base part (26) passes below the shroud (2,3) and has an upper face that defines or supports a guide track (24) and a pair of arms that project upwards on opposing sides of the shroud (2,3) to connect with the remainder of the main support bracket (12).

The guide track (24) comprises a raised rib that extends in parallel with the axis of the steering shaft and locates the roller (22). The roller (22) can roll along the raised rib during adjustment of the steering column assembly (1) when the clamp mechanism (8) is in the released condition.

If the clamp mechanism (8) is released with the steering wheel at its highest rake position, the shroud (2, 3) will attempt to rotate around the pivot axle due to gravity. The sprung support assembly (14) will provide a reaction torque between the shroud (2,3) and the base part (26) of the mounting bracket. Typically, the spring rate of the spring arms (18) is chosen so that the shroud (2,3) will balance in its mid-height position. It is then easier for a driver to raise the steering wheel to a desired rake as the spring element (16) takes much of the weight.

Figure 4:
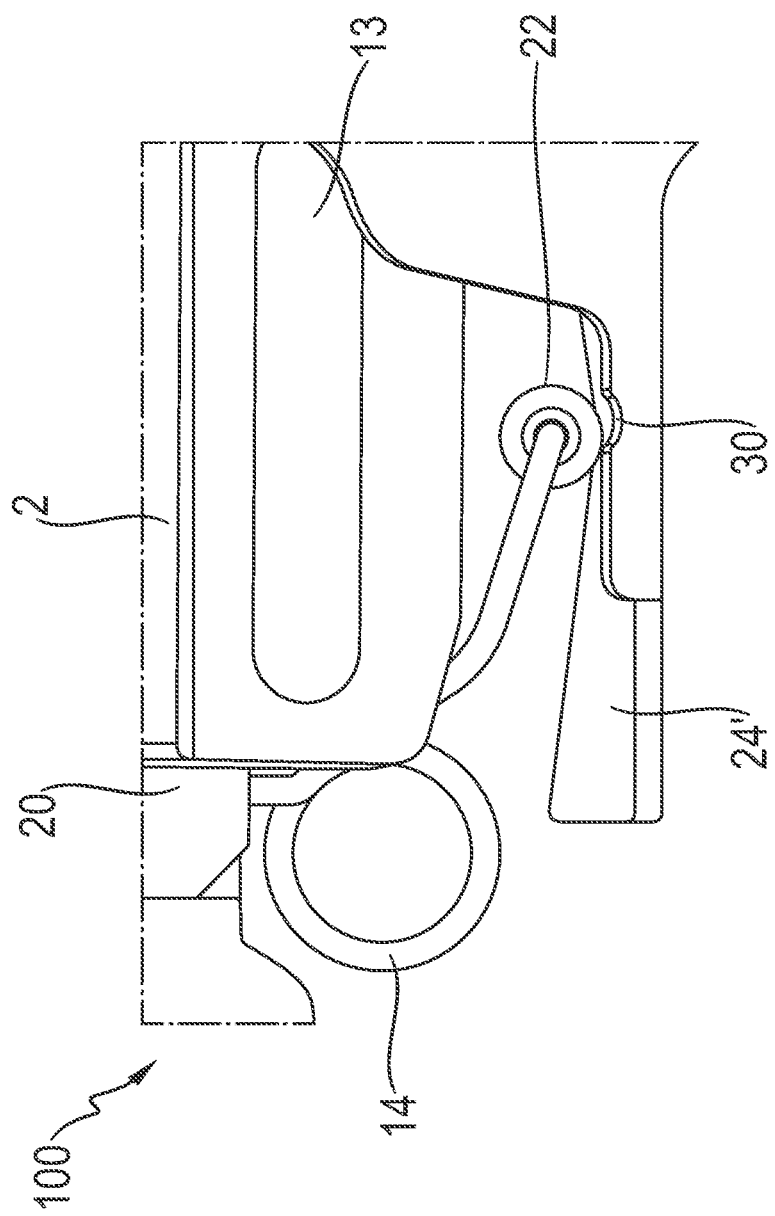
FIG. 4 is a view from the side of an alternative configuration of guide track on the mounting bracket of a second arrangement of the disclosure.

FIG. 4 shows an alternative arrangement of a steering column assembly (100) that falls within the scope of the disclosure. All the parts of this arrangement are the same as the first arrangement apart from the shape of the guide track. In this arrangement the guide track (24') is not perfectly parallel to the axis of the steering shaft. Instead it has two inclined sections that meet at their lowest ends to form a V-shape. Where they meet a partially circular groove (30) is formed in the guide track (24') that has a diameter complementary to the outer diameter of the roller (22).

In use of the second arrangement, the spring rate of the spring element (16) and the shape of the guide track (24') will cause the upper shroud part (2,3) to self-centre at a mid-range position of the reach of the steering column assembly (2) where the roller (22) enters the groove (30).

Figure 5:
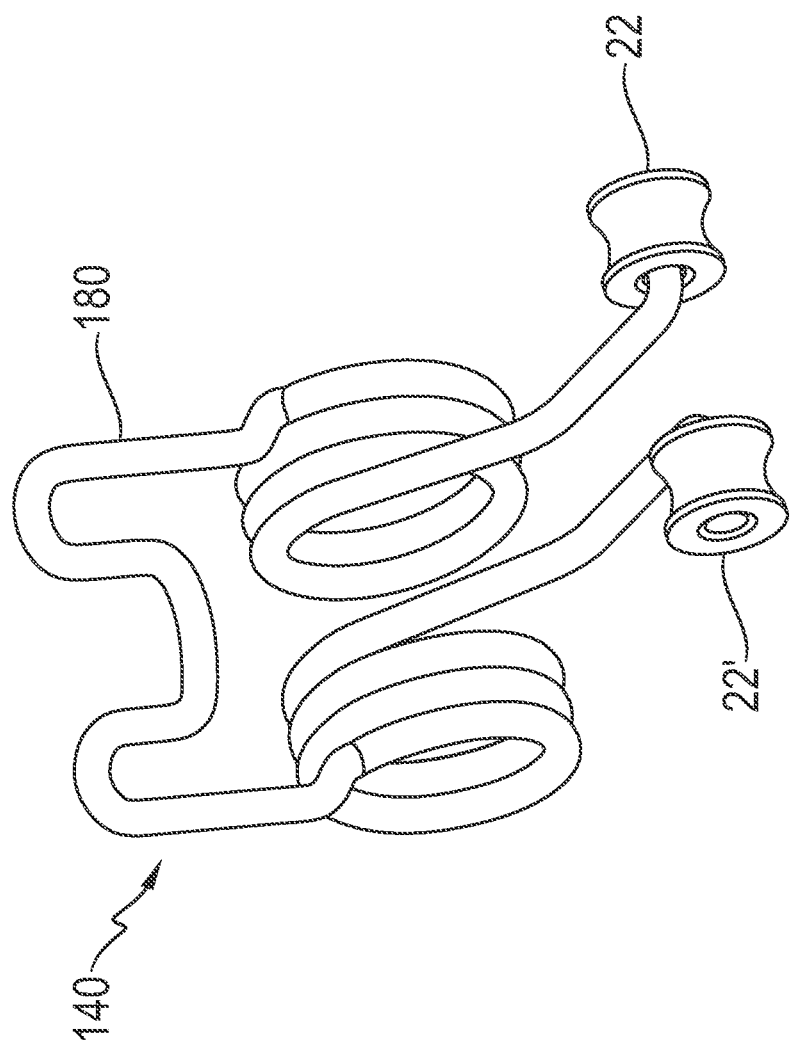
FIG. 5 is a view of an alternative shape of sprung support assembly.
Figure 6:
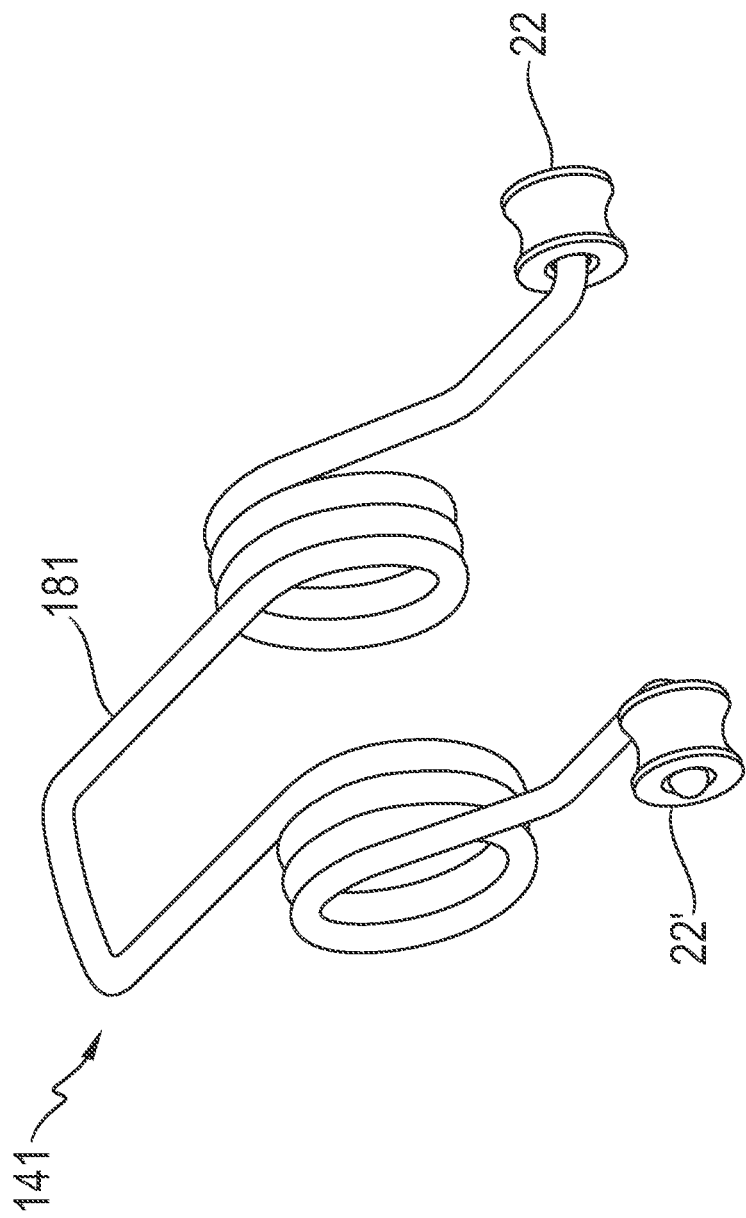
FIG. 6 is a view of a further alternative shape of sprung support assembly.

FIGS. 5 to 7 show three different shapes of sprung support assemblies (140,141,142). The sprung support assembly (140) of FIG. 5 has two ropers 22 and 22' on the second ends of the spring element (180) rather than one, each supported by a respective stub axle. The sprung support assembly (141) of FIG. 6 is similar to that of FIG. 5 but the orientation of the first ends of the spring arms (181) is different and the stub axles project from the outside plane of the coil spring rather than from the inside plane. FIG. 7 shows a still further arrangement in which the orientation of the first ends of the spring arms (182) is different again from that of FIGS. 5 and 6.

The sprung support assemblies (140,141,142) with two rollers (22, 22') may be located such that each roller engages a respective lane in the guide track of the base part (26). FIGS. 8a and 8b show the possible location of the sprung support assemblies (141,142) of FIGS. 6 and 7 in completed steering column assemblies (200,300).

The invention claimed is:

1. A steering column assembly for a vehicle comprising:
   a shroud comprising an axially movable upper part and an axially fixed lower part, the upper and lower parts moving telescopically to provide adjustment for reach of the steering column assembly;
   a steering shaft which is supported by the shroud;
   a pivot which connects a part of the lower part to a fixed part of the vehicle;
   a clamp mechanism which releasably fixes the upper and lower shroud parts in position relative to one another and which also fixes the shroud in position relative to a further fixed part of the vehicle;
   a mounting bracket, fixed relative to the vehicle;
   a sprung support assembly which includes at least one guide element that has an outer surface that engages a complimentary shaped guide track of the mounting bracket,
   wherein the sprung support assembly is fixed in position to the upper shroud part and bears upon the mounting bracket such that the sprung support assembly provides a reaction force that at least partially supports the shroud when the clamp mechanism is released;
   wherein the at least one guide elements comprise a cylindrical roller.

2. A steering column assembly according to claim 1 wherein the sprung support assembly comprises a spring element with a pair of spring arms, each spring arm comprising a coil spring and having a first end terminated with an extending part that is fixed to the upper shroud part and a second end terminated with an extending part to define an axle that supports the at least one guide element.

3. A steering column assembly according to claim 2 wherein each second end of the pair of spring arms joins a corresponding part of the other spring arm.

4. A steering column assembly according to claim 2 wherein each extending part of the second ends of the pair of spring arms extends substantially orthogonal to a axis of the shroud and projects either away or towards a corresponding part of the other spring arm.

5. A steering column assembly according to claim 2 wherein the first ends of each spring arm are connected by a linking portion that extends transverse to the axis of the shroud and locates within a recess in the upper shroud part.

6. A steering column assembly according to claim 5, wherein the linking portion is press fit within the recess.

7. A steering column assembly according to claim 2 wherein the first ends of the spring arms extend from the coil springs towards the steering wheel.

8. A steering column assembly according to claim 7, wherein the central point locates the groove.

9. A steering column assembly according to claim 2, wherein the first ends of the spring arms extend vertically.

10. A steering column assembly according to claim 2, wherein the first ends of the spring arms extend in a direction away from the steering wheel.

11. A steering column assembly according to claim 1 wherein the guide track extends in a direction that is parallel to the axis of the steering shaft such that the torque applied to the steering shroud by the sprung support assembly remains constant when the clamp mechanism is released for any reach position of the steering column assembly.

12. A steering column assembly according to claim 1, wherein the guide track is inclined downwards along two portions with the lowest end of each inclined portion meeting at a point such that the forces acting on the steering column assembly will cause the guide part to settle to the central point, such that the steering column assembly settles to a mid-range reach position where the assembly is adjustable for reach, when the clamp mechanism is released.

13. A steering column assembly according to claim 1, wherein the guide track is shaped so that on release of the clamp mechanism in any reach position the weight of the steering column assembly shroud and the combined weight of the steering wheel and steering shaft are perfectly counterbalanced such that the rake will then not change as the clamp is released until the driver applies an external force to the steering wheel.

14. A steering column assembly according to claim 1, wherein the at least one guide element is arranged to roll along the guide track.

15. A steering column assembly according to claim 1, wherein the clamp mechanism is arranged to pass through a slot in the upper shroud part.

16. A steering column assembly according to claim 15, wherein the slot is parallel to an axis of the steering shaft.

17. A steering column assembly according to claim 1, wherein the pair of spring arms comprise a spring rate such that the shroud is arranged to balance in a mid-height position when the clamp is released.

18. A steering column assembly for a vehicle comprising:
   a shroud comprising an axially movable upper part and an axially fixed lower part, the upper and lower parts moving telescopically to provide adjustment for reach of the steering column assembly;
   a steering shaft which is supported by the shroud;
   a pivot which connects a part of the lower part to a fixed part of the vehicle;
   a clamp mechanism which releasably fixes the upper and lower shroud parts in position relative to one another and which also fixes the shroud in position relative to a further fixed part of the vehicle;
   a mounting bracket, fixed relative to the vehicle;
   a sprung support assembly which includes at least one guide element that has an outer surface that engages a complimentary shaped guide track of the mounting bracket,
   wherein the sprung support assembly is fixed in position to the upper shroud part and bears upon the mounting bracket such that the sprung support assembly provides a reaction force that at least partially supports the shroud when the clamp mechanism is released;
   wherein the guide track additionally comprises a groove that has a diameter complementary to the outer diameter of the guide element such that the groove helps a user find the mid-range position for reach during adjustment.

19. A steering column assembly according to claim 18, wherein the groove is partially circular.

\* \* \* \* \*